United States Patent [19]

Nakane et al.

[11] Patent Number: 4,954,541

[45] Date of Patent: Sep. 4, 1990

[54] FLAME-RETARDANT RESIN COMPOSITION AND ELECTRIC WIRE

[75] Inventors: Toshio Nakane; Yukihiko Kageyama; Hiroaki Konuma; Kenji Hijikata, all of Shizuoka, Japan

[73] Assignee: Polyplastics Co., Ltd., Osaka, Japan

[21] Appl. No.: 271,323

[22] Filed: Nov. 15, 1988

[30] Foreign Application Priority Data

Dec. 9, 1987 [JP] Japan .................. 62-311547

[51] Int. Cl.$^5$ .................. C08K 5/35; C08K 5/34
[52] U.S. Cl. .................. 524/86; 524/95; 524/96; 524/97; 524/98; 524/102; 524/104
[58] Field of Search ............ 524/86, 98, 102, 104, 524/97, 95; 428/395, 458; 544/96, 97; 548/225, 228

[56] References Cited

U.S. PATENT DOCUMENTS

| | | | |
|---|---|---|---|
| 4,080,360 | 3/1978 | Schlichting et al. | 524/102 |
| 4,499,219 | 2/1985 | Buxbaum | 524/94 |

FOREIGN PATENT DOCUMENTS

| | | |
|---|---|---|
| 68327 | 1/1983 | European Pat. Off. . |
| 2533097 | 2/1977 | Fed. Rep. of Germany . |
| 56-120757 | 9/1981 | Japan . |
| 59-012952 | 1/1984 | Japan . |
| 63-108052 | 5/1988 | Japan . |

Primary Examiner—Veronica P. Hoke
Attorney, Agent, or Firm—Birch, Stewart, Kolasch & Birch

[57] ABSTRACT

A resin composition, being useful for coating on electric wire, comprises an aromatic polyester, a halogenated compound such as diol, diglycidyl and dicarboxylic acid and a di-heterocyclic compound.

13 Claims, No Drawings

FLAME-RETARDANT RESIN COMPOSITION AND ELECTRIC WIRE

BACKGROUND OF THE INVENTION

1. Field of the Invention

The present invention relates to a resin which is improved in flame retardance by a simple method Particularly, it relates to a flame-retardant resin composition which is further improved in thermal stability and flexibility and can give an appearance of being free from bleeding and the flexibility of which is not lowered by heat history, and an electric wire coated with said composition.

2. Discussion of Related Art

Up to this time, rubbers, polyvinyl chloride, polyethylene, polypropylene and nylon have been used as electric wire coating materials. Among these materials, polyvinyl chloride in particular has been frequently used by virtue of its flame retardance and mechanical strengths. Recently, as the environment in which these coating materials are used has become severe, the characteristics required of the coating materials have also become severe. That is, the coating materials have been required to have not only excellent heat resistance, electrical characteristics and flame retardance but also be capable of forming a coating thin enough to attain space saving.

Although fluororesins and crosslinked polyethylene satisfy these requirements, they are poor in their capability of forming a thin coating. Further, fluororesins are expensive, thus being unsatisfactory.

An increasing interest has been taken in polyethylene terephthalate and polybutylene terephthalate, because they exhibit a good capability of forming a thin coating and are excellent in mechanical strengths (such as flexibility and wear resistance), heat resistance and electrical characteristics. However, they are insufficient in flame retardance.

Various methods for imparting flame retardance to these resins have been known, which are broadly classified into addition type and reaction type. The methods of the former type can simply impart flame retardance to the resins by using antimony hydroxide, antimony trioxide, boron compounds, bromine compounds or phosphorus compounds. However, the methods have disadvantages in that the added flame retardant bleeds from the surface of the resin when subjected to prolonged exposure or in a heated environment, thereby inflicting damage to the appearance of the resin and that the added flame retardant lowers the flexibility of the resin. The methods of the latter type are characterized by using a reactive flame-retardant monomer, oligomer or polymer prepared by introducing an epoxy or vinyl group or an ester-forming functional group into a monomer, oligomer or polymer containing bromine or phosphorus atoms and comprise incorporating such flame-retardant in a molecular skeleton or in a polymer molecule by the reaction of polymers with each other. These reactive flame retardants cause no bleeding and impart flexibility to the resin, so that the methods of reaction type is free from the disadvantages of those of the addition type, thus being advantageous in this regard. However, the incorporation of a flame-retardant monomer in a polymer skeleton by an ordinary process results in a low degree of polymerization, so that a complicated operation is required for the incorporation with a satisfactory degree of polymerization. Although the addition of a reactive flame-retardant oligomer or polymer is free from the disadvantage as described above, it has another disadvantage in that the interaction between a base polymer and such an oligomer or polymer occurs during kneading to cause a lowering in the molecular weight or mechanical properties. Particularly, this disadvantage is significant for a polyester or polyamide.

Further, the above-mentioned polyalkylene terephthalate resins exhibit significant lowering in the flexibility and mechanical strengths such as impact resistance by heat history including thermal treatment after coating and thermal condition in service owing to their crystalline nature, so that the use thereof around a heat source or in an environment in danger of heat buildup must be avoided. Thus, the use of polyalkylene terephthalate is considerably limited.

With the purpose of overcoming the disadvantage as described above, there have been made attempts of adding an elastomer or an amorphous polymer to the resin to thereby lower the crystallinity thereof as much as possible and attempts of partially crosslinking the resin to thereby maintain its mechanical strengths.

Although the former attempts give a slightly recognizable improvement, the resin composition improved according to the former attempts still contains crystalline resin matrix, so that the composition is not tolerable to prolonged heat history and exhibits mechanical characteristics (such as wear resistance) lowered by a reduced content of crystalline resin in the composition.

Although the latter attempts give a slightly recognizable improvement in the stability of mechanical characteristics due to the crosslinking, they are disadvantageous in that the crosslinked resin exhibits lowered flexibility and that the crosslinking is difficult to control and brings about a remarkable lowering in the processability.

SUMMARY OF THE INVENTION

In view of the above problems, the inventors of the present invention have eagerly studied to develop a process in which flame retardance can be imparted to a polymer without lowering its mechanical properties to give a flame-retardant polymer which is excellent in thermal stability, flexibility, other physical properties and appearance and have found that a specified compound is effective in this respect. The present invention has been accomplished on the basis of this finding.

Namely, the present invention relates to a flame-retardant resin composition which comprises (A) an aromatic polyester prepared by condensation polymerization between (a) a compound substantially comprising an aromatic dicarboxylic acid or an ester-forming derivative thereof and (b) a component substantially comprising an aliphatic glycol or an ester-forming derivative thereof, (B) 0.1 to 30% by weight based on the total amount of the composition of a compound represented by the general formula (1) or (2) and (C) 0.1 to 30% by weight based on the total amount of the composition of a compound represented by general formula (3), and an electric wire coated with said composition:

  (1)

-continued

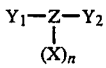 (2)

wherein X stands for a halogen atom; $Y_1$ and $Y_2$ are each a group selected from among hydroxyl, carboxyl, glycidyl ester and glycidyl ether groups; Z is a monovalent or divalent organic group and n is an integer of 1 or more and

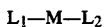 (3)

wherein $L_1$ and $L_2$ may be the same or different from each other and are each a 3- to 8-membered cyclic reactive group selected from among those represented by the general formulae (4) to (7):

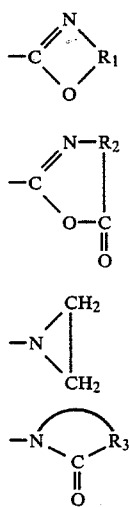

(4)

(5)

(6)

(7)

$R_1$ to $R_3$ are each a divalent organic group wherein a hydrogen atom directly bonded to the ring may be substituted with an alkyl and/or aryl group and M is a divalent organic group.

The polyester composition according to the present invention will now be described in more detail.

First, one of the components constituting the aromatic polyester (A) to be used as a base component of the composition or coating material according to the present invention is a component (a) substantially comprising an aromatic dicarboxylic acid or an ester-forming derivative thereof. Representative examples thereof include terephthalic acid and derivatives thereof. The component (a) may contain, as an axiliary component, a dicarboxylic acid such as isophthalic, naphthalenecarboxylic or naphthalene dicarboxylic acid or a derivative thereof, a fatty acid such as adipic, sebacic, trimellitic or succinic acid or an ester-forming derivative thereof or an aromatic hydroxycarboxylic acid such as hydroxybenzoic or hydroxynaphthoic acid or an ester-forming derivative thereof.

The other of the components constituting the aromatic polyester (A) is component (b) substantially comprising an aliphatic diol or an ester-forming derivative thereof. Representative examples thereof include $C_{2\sim 8}$ low-molecular weight aliphatic glycols such as ethylene glycol, 1,4-butylene glycol, 1,3-propanediol, 1,4-butenediol, 1,6-hexanediol and 1,8-octanediol. A high-molecular weight glycol such as polyalkylene oxide glycol may be used simultaneously with a low-molecular weight glycol as described above. Examples of the plyalkylene oxide glycol include polyethylene oxide glycol and polybutylene oxide glycol. The simultaneous use of such a high-molecular weight glycol is very effective in enhancing the elongation of the aromatic polyester as a wire coating material to thereby improve the flexing resistance thereof. Further, the component (b) may contain, as an auxiliary component, an aromatic alcohol such as bisphenol A, 4,4'-dihydroxybiphenyl or a phosphinic acid derivative having an aromatic diol group; an adduct of an alcohol with an alkylene oxide such as bisphenol A-ethylene oxide (2 mol) adduct or bisphenol A-propylene oxide (2 mol) adduct; a polyhydroxy compound such as glycerin or pentaerythritol or an ester-forming derivative thereof.

Examples of the halogen-containing compound (B) represented by the general formula (1) or (2) include compounds represented by the general formulas (8) to (15), wherein the halogen (X) is preferably a bromine atom.

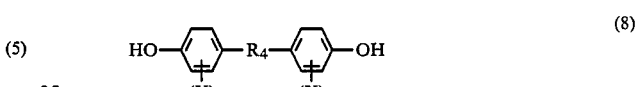 (8)

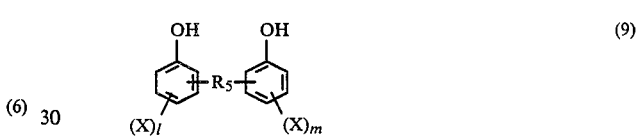 (9)

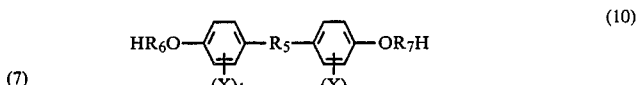 (10)

 (11)

 (12)

 (13)

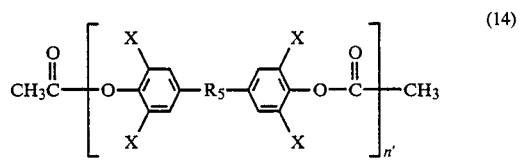 (14)

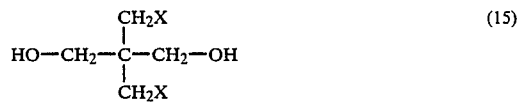 (15)

wherein
$R_4$, $R_5$; a divalent group selected from among

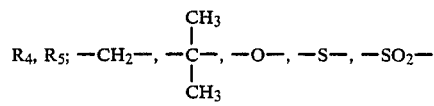

R$_6$, R$_7$; a divalent group selected from among R$_6$, R$_7$;
—C$_2$H$_4$—, —C$_3$H$_6$—, —(C$_2$H$_4$O)$_{n'}$—, —(C$_3$H$_6$O)$_{n'}$—
X; a halogen atom
l, m; 1 to 4
n'; an integer of 1 or higher.

When the halogen in the above formulae is bromine, examples of the compound represented by the general formula (8) include tetrabromobisphenol A and tetrabromobisphenol sulfone; examples of the compound represented by the general formula (9) include tetrabromobisphenol F; examples of the compound of the general formula (10) include tetrabromobisphenol A-ethylene oxide (2 mol) adduct, tetrabromobisphenol A-propylene oxide (2 mol) adduct, tetrabromobisphenol sulfone-ethylene oxide (2 mol) adduct and tetrabromobisphenol sulfone-propylene oxide (2 mol) adduct; examples of the compound of the general formula (11) include tetrabromohydroquinone, those of the compound of the formula (12) include tetrabromohydroquinoneethylene oxide (2 mol) adduct; those of the compound of the formula (13) include tetrabromoterephthalic acid and those of the compound of the formula (14) include polycarbonate of tetrabromobisphenol A.

The compound having the formula (1) includes the following (16) to (21).

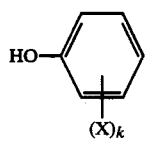  (16)

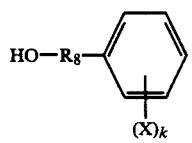  (17)

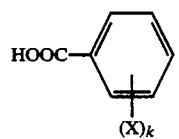  (18)

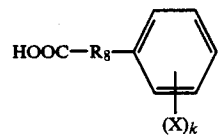  (19)

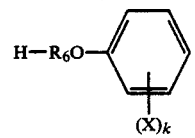  (20)

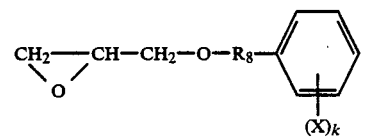  (21)

In the formulae, R$_6$ is —C$_2$H$_4$—, —C$_3$H$_6$—, oxyethylene, oxypropylene, polyoxyethylene or polyoxypropylene; R$_8$ is an alkylene having 1 to 30 carbon atoms which may have a substituent of an aryl and k is an integer of 1 to 5.

For example the compound (1) includes pentabromophenol for (16), pentabromo-benzylalcohol for (17), pentabromo-benzolic acid for (18), an ethylene oxide adduct to pentabromo-phenol for (20) and pentabromobenzyl glycidyl ether for (21).

In the formulae (1) and (2), Z is preferred to be one of those included in the formulae (8) to (14) and (16) to (21) and in other words a monovalent or divalent organic group having at least one aromatic group.

The compound (2) is preferable for the compound (B), more preferable are the compounds (8) to (13). In the definition, Z is preferred to be a divalent organic group selected from

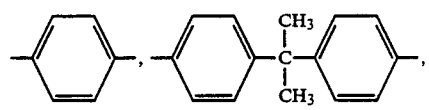

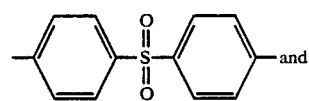 and

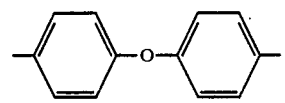

In the compound (C), R$_1$, R$_2$ and R$_3$ each are preferred to be a straight alkylene having 1 to 6 carbon atoms which may have a substituent(s) selected from alkyl groups having 1 to 10 carbon atoms and aryl groups having 6 to 12 carbon atoms. Preferable are ethylene for R$_1$, methylene and ethylene for R$_2$ and a C$_3$ to C$_5$ alkylene for R$_3$, which may have a substituent(s) selected C$_1$ to C$_6$ alkyl and phenyl. M is preferred to be a C$_1$ to C$_{10}$ alkylene or an organic group having at least one aromatic ring or alicyclic ring.

The nitrogenous 3- to 8-membered cyclic compound (C) represented by the general formula (3) includes various compounds.

The group represented by the formula (4) is preferably one wherein R$_1$ is an ethylene group, i.e., an oxazolinyl group. The oxazolinyl group can be formed by, for example, the reaction of a carboxylic acid with ethanolamine to give a compound of the formula (3).

The compound (C) also includes a reaction product between a dihydroxy compound or dicarboxylic compound and a bisoxazoline compound, bisoxazolone compound, bisoxazinone, bisaziridine compound or bislactam compound, having terminal groups shown by the formulae (4) to (7).

Particular examples of the bisoxazoline compound include 2,2'-methylenebis(2-oxazoline), 2,2'-ethylenebis(2-oxazoline), 2,2'-ethylenebis(4-methyl-2-oxazoline), 2,2'-propylenebis(2-oxazoline), 2,2'-tetramethylenebis(2-oxazoline), 2,2'-hexamethylenebis(2-oxazoline), 2,2'-octamethylenebis(2-oxazoline), 2,2'-p-phenylenebis(2-oxazoline), 2,2'-p-phenylenebis(4-methyl-2-oxazoline), 2,2'-p-phenylenebis(4-dimethyl-2-oxazoline), 2,2'-p-phenylenebis(4-phenyl-2-oxazoline), 2,2'-m-phenylenebis(2-oxazoline), 2,2'-m-phenylenebis(4-methyl-2-oxazoline), 2,2-m- phenylenebis(4,4-dimethyl-2-oxazoline), 2,2'-m-phenylenebis(4-phenyl-2-oxazoline), 2,2'-o-phenylenebis(2-oxazoline), 2,2'-phenylbis(4-methyl-2-oxazoline), 2,2'-bis(2-oxazoline), 2,2'-bis(4-methyl-2-oxazoline), 2,2'-bis(4-methyl-2-oxazoline) and 2,2'-bis(4-phenyl-2-oxazoline). These oxazoline compounds may be used either alone or as a mixture of two or more of them.

Among the above bisoxazoline compounds, those having an aromatic group are preferred and those containing a phenylene group are still preferred. 2,2'-m-Phenylenebis(2-oxazoline) and 2,2'-p-phenylenebis(2-oxazoline) are particularly preferred.

The group represented by the formula (5) is preferably one wherein $R_2$ is a methylene group, i.e., an oxazolonyl group, or one wherein $R_2$ is an ethylene group, i.e., an oxazinonyl group. These groups can be easily formed by dehydrating N-acyl-α- or β-amino carboxylic acid with, for example, acetic anhydride.

Examples of the bisoxazolone compound include 2,2'-bis(5-(4H)-oxazolone), 2,2'-methylenebis-(5(4H)-oxazolone), 2,2'-ethylenebis(5(4H)-oxazolone), 2,2'-tetramethylenebis(5(4H)-oxazolone), 2,2'-hexamethylenebis(5(4H)-oxazolone), 2,2'-decamethylenebis(5(4H)-oxazolone), 2,2'-p-phenylenebis(5(4H)-oxazolone), 2,2'-m-phenylenebis(5(4H)-oxazolone), 2,2'-naphthalenebis(5(4H)-oxazolone), 2,2'-diphenylenebis(5(4H)-oxazolone), 2,2'-(1,4-cyclohexylene)-bis(5(4H)-oxazolone), 2,2'-bis(4-methyl-5(4H)-oxazolone), 2,2'-methylehebis(4-methyl-5(4H)-oxazolone), 2,2'-ethylenebis-(4-methyl-5(4H)-oxazolone), 2,2'-tetramethylenebis(4-methyl-5(4H)-oxazolone), 2,2'-hexamethylenebis(4-methyl-5(4H)-oxazolone), 2,2'-decamethylenebis(4-methyl-5(4H)-oxazolone), 2,2'-p-phenylenebis-(4-methyl-5(4H)-oxazolone), 2,2'-m-phenylenebis-(4-methyl-5(4H)-oxazolone), 2,2'-naphthalenebis(4-methyl-5(4H)-oxazolone), 2,2'-diphenylenebis-(4-methyl-5(4H)-oxazolone), 2,2'-(1,4-cyclohexylene)bis(4-methyl-5(4H)-oxazolone), 2,2'-bis(4,4-dimethyl-5(4H)-oxazolone), 2,2'-methylenebis(4,4-dimethyl-5(4H)-oxazolone), 2,2'-ethylenebis(4,4-dimethyl-5(4H)-oxazolone), 2,2'-tetramethylenebis(4,4-dimethyl-5(4H)-oxazolone), 2,2'-hexamethylenebis(4,4-dimethyl-5(4H)-oxazolone), 2,2'-octamethylenebis(4,4-dimethyl-5(4H)-oxazolone), 2,2'-decamethylenebis(4,4-dimethyl-5(4H)-oxazolone), 2,2'-p-phenylenebis(4,4-dimethyl-5(4H)-oxazolone), 2,2'-m-phenylenebis(4,4-dimethyl-5-(4H)-oxazolone), 2,2'-naphthalenebis(4,4-dimethyl-5(4H)-oxazolone), 2,2'-diphenylenebis(4,4-dimethyl-5(4H)-oxazolone), 2,2'-(1,4-cyclohexylene)-bis(4,4-dimethyl-5(4H)-oxazolone), 2,2'-bis(4-isopropyl-5(4H)-oxazolone), 2,2'-methylenebis(4-isopropyl-5(4H)-oxazolone), 2,2'-ethylenebis-(4-isopropyl-5(4H)-oxazolone), 2,2'-tetramethylenebis(4-isopropyl-5(4H)-oxazolone), 2,2'-hexamethylenebis(4-isopropyl-5(4H)-oxazolone), 2,2'-p-phenylenebis(4-isopropyl-5(4H)-oxazolone), 2,2'-m-phenylenebis(4-isopropyl-5(4H)-oxazolone), 2,2'-naphthalenebis(4-isopropyl-5(4H)-oxazolone), 2,2'-bis(4-isobutyl-5(4H)-oxazolone), 2,2'-methylenebis(4-isobutyl-5(4H)-oxazolone), 2,2'-ethylenebis(4-isobutyl-5(4H)-oxazolone), 2,2'-tetramethylenebis(4-isobutyl-5(4H)-oxazolone), 2,2'-hexamethylenebis(4-isobutyl-5(4H)-oxazolone), 2,2'-p-phenylenebis(4-isobutyl-5(4H)-oxazolone), 2,2'-m-phenylenebis(4-isobutyl-5(4H)-oxazolone) and 2,2'-naphthalenebis(4-isobutyl-5(4H)-oxazolone.

Examples of the bisoxazinone compound include 2,2'-bis(3,1-benzoazin-4-one), 2,2'-methylenebis-(3,1-benzoxazin-4-one), 2,2'-ethylenebis(3,1-benzoazin-4-one), 2,2'-tetramethylenebis(3,1-benzoxazin-4-one), 2,2'-hexamethylenebis(3,1-benzoxazin-4-one), 2,2'-decamethylenebis(3,1-benzoxazin-4-one), 2,2'-p-phenylenebis(3,1-benzoxazine-4-one), 2,2'-m-phenylenebis(3,1-benzoxazin-4-one), 2,2'-naphthalenebis(3,1-benzoxazin-4-one), 2,2'-(4,4'-diphenylene)bis(3,1-benzoxazin-4-one), 2,2'-(1,4-cyclohexylene)bis-(3,1-benzoxazin-4-one), 2,2'-bis(4,4-dihydro-1,3,6H-oxazin-6-one), 2,2'-methylenebis(4,5-dihydro-1,3,6H-oxazin-6-one), 2,2'-ethylenebis(4,5-dihydro-1,3,6H-oxazin-6-one), 2,2'-tetramethylenebis(4,5-dihydro-1,3,6H-oxazin-6-one), 2,2'-p-phenylenebis-(4,5-dihydro-1,3,6H-oxazin-6-one), 2,2'-m-phenylenebis(4,5-dihydro-1,3,6H-oxazin-6-one), 2,2'-bis(4-methyl-5-hydro-1,3,6H-oxazin-6-one), 2,2'-ethylenebis(4-methyl-5-hydro-1,3,6H-oxazin-6-one), 2,2'-o-phenylenebis(4-methyl-5-hydro-1,3,6H-oxazin-6-one), 2,2'-m-phenylene(4-methyl-5-hydro-1,3,6H-oxazin-6-one), 2,2'-p-phenylenebis(4-hydro-5-methyl-1,3,6H-oxazin-6-one) and 2,2-m-phenylene bis(4-hydro-5-methyl-1,3,6H-oxazin-6-one).

Compounds of the formula (3) wherein $L_1$ and/or $L_2$ are each an aziridinyl group represented by the formula (6) can be easily prepared by reacting ethyleneimine with an acid chloride or an isocyanate.

Preferred examples of the compound of the formula (3) wherein $L_1$ and/or $L_2$ are each a lactam group represented by the formula (7) include pyrrolidone, piperidone and caprolactam which are each corresponding to a compound of the formula (3) having a group of the formula (7) wherein $R_3$ is a trimethylene, tetramethylene or pentamethylene group, respectively. These compounds can be easily prepared by reacting a lactam with an acid chloride or an isocyanate similarly to the preparation of the above compound having a group of the formula (6).

Examples of the acid chloride to be used in the above reactions include ones derived from terephthalic, isophthalic, naphthalenedicarboxylic, adipic, sebacic, trimellitic and succinic acids.

Examples of the diisocyanate to be used in the above reactions include toluene diisocyanate, methylenediphenyl diisocyanate, xylylene diisocyanate, naphthylene diisocyanate, 3,3'-dimethyldiphenyl 4,4'-diisocyanate, hexamethylene diisocyanate, isophorone diisocyanate, hydrogenated methylenebiphenyl diisocyanate, hydrogenated toluene diisocyanate, lysine diisocyanate and bis(2-isocyanatoethyl) fumarate.

In the composition according to the present invention which comprises the aromatic polyester (A), the halogenated compound (B) and the nitrogenous 3- to 8-membered cyclic compound (C), the compounds (B) and (C) are preferably contained each in an amount of 0.1 to 30% by weight based on the total amount of the composition and at a molar ratio of the compound (B) to the compound (C) of between 2:1 and 1:2.

When the composition of the present invention is used as a coating material in the field wherein a high oxygen index is required as service condition, such an objective oxygen index can be attained by suitably selecting the content of the compound (B) to thereby control the halogen content of the composition.

The aromatic polyester (A) to be used in the present invention can be prepared by a conventional process such as melt polymerization, interfacial polymerization or solid-phase polymerization and may have an intrinsic viscosity of about 0.5 to 3.0.

The composition of the present invention exhibits excellent performance, even when no additives are added thereto. However, if necessary, the composition may contain, with the purpose of enhancing the performance, a stabilizer such as antioxidant or ultraviolet absorber, antistatic agent, other flame-retardant or flame-retardant auxiliary, coloring agent such as dye or pigment, lubricant for improving the fluidity and mold release characteristics, crystallization accelerator (nucleating agent), inorganic substance or the like.

The stabilizer includes hindered phenols, amines and phosphorus compounds.

Examples of the hindered phenol include 2,2'-methylenebis(4-methyl-6-t-butylphenol), hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl)propionate, 1,3,5-trimethyl-2,4,6-tris(3,5-di-t-butyl-4-hydroxybenzyl)-benzene, n-octadecyl 3-(4'-hydroxy-3',5'-di-t-butylphenyl)propionate, 4,4'-methylenebis(2,6-di-t-butylphenol), 4,4'-butylidenebis(6-t-butyl-3-methylphenol), 2,2'-thiodiethyl bis[3-(3,5-di-t-butyl-4-hydroxypehnyl)-propionate, distearyl 3,5-di-t-butyl-4-hydroxybenzyl-phosphonate and 2-t-butyl-6-(3-t-butyl-5-methyl-2-hydroxybenzyl)-4-methylphenyl acrylate. These compounds may be used either alone or as a mixture of two or more of them. Among the compounds described above, hexamethylene glycol bis(3,5-di-t-butyl-4-hydroxyhydrocinnamate), tetrakis[methylene(3,5-di-t-butyl-4-hydroxyhydrocinnamate)] methane and triethylene glycol bis-3-(3-t-butyl-4-hydroxy-5-methylphenyl)propionate are particularly preferred.

Examples of the amine include N-phenyl-N'-isopropyl-p-phenylenediamine, N,N'-diphenyl-p-phenylenediamine, 4,4'-bis(4-α,α-dimethylbenzyl)diphenylamine, condensate of diphenylamine with acetone, N-phenylnaphthylamine and N,N'-di-β-naphthyl-phenylenediamine.

Examples of the phosphorus compound include phosphonite compounds represented by the general formula:

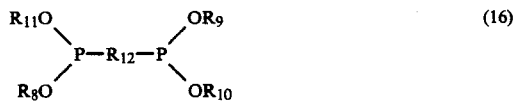 (16)

wherein $R_8$, $R_9$, $R_{10}$ and $R_{11}$ may be the same or different and are each an alkyl, substituted alkyl, aryl or substituted aryl group having 1 to 25 carbon atoms. Examples thereof include methyl, ethyl, butyl, octyl, decyl, lauryl, tridecyl, stearyl, phenyl and alkyl- and/or alkoxy-substituted phenyl groups. $R_{12}$ stands for an alkylene, substituted alkylene, arylene or substituted arylene having 4 to 33 carbon atoms, while examples thereof include butylene, octylene, phenylene, naphthylene and diphenylene groups and groups represented by the formula:

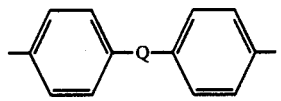

(wherein Q is an oxy, sulfonyl, carbonyl, methylene, ethylidene, butylidene, isopropylene or diazo group). A particularly preferred example of the phosphonite is tetrakis(2,4-di-t-butylphenyl) 4,4'-diphenylenephosphonite.

A stabilizer as described above is added in an amount of 0.01 to 5% by weight, preferably 0.1 to 3% by weight, based on the total amount of the composition.

Examples of the flame retardant auxiliary include antimony compounds such as antimony trioxide and antimony halides; metal compounds including zinc compounds and bismuth compounds; magnesium hydroxide and clayey silicate such as asbestos.

The inorganic substance includes inorganic fibers such as glass fiber, ceramic fiber, boron fiber, potassium titanate fiber and asbestos; powdery or granular materials such as potassium carbonate, highly dispersible silicate, alumina, aluminum hydroxide, talc, clay, mica, glass flake, glass powder, glass bead, quartz powder, quartz sand, wollastonite, carbon black, barium sulfate, plaster of Paris, silicon carbide, alumina, boron nitride and silicon nitride; flaky inorganic compounds and whiskers.

These inorganic fillers may be used alone or as a mixture of two or more of them.

Further, the composition of the present invention may contain one or more organic high-molecular weight substances as auxiliary components for the purpose of improving the melt extrusion coating properties, lubricity and flexibility of the composition. Examples of the high-molecular weight substance include polyesters having other skeletons, polyamide, carboxylic acid-modified olefins and copolymers thereof, polyofefins such as polyethylene, polypropylene and polybutene, polyacrylates, modified polyolefins such as ABS, engineering plastics such as polycarbonate, polyphenylene oxide, polyphenylene sulfide and fluororesins and elastomeric polymers such as polyurethane, butyl rubber, ethylene-propylene rubber and various elastomers.

The composition of the present invention can be prepared by kneading a mixture comprising the essential components (A), (B) and (C) with an ordinary melt mixer such as an extruder and pelletizing the kneaded mixture.

The composition of the present invention is useful as a coating material for an electrically conductive wire. The coating of an electrically conductive wire with the composition of the present invention can be carried out by a conventional process.

Namely, a running conductive wire is coated with a coating material comprising the composition of the present invention by melt extrusion. In this process, the extrusion of the composition and the running of the wire may be carried out coaxially. Alternatively, the extrusion may be carried out by using a crosshead having a certain angle against the direction of the running. The electric wire can be produced by any of these methods.

The extruder to be used in the coating of an electric wire is preferably one of screw type, because the use thereof facilitates the control of the flow rate of a coating material.

The unevenness in the coating thickness is detected by X-ray method, supersonic wave method or the like.

The eccentricity due to unevenness in the coating thickness is shown by concentricity ($e_c$). The higher the value of $e_c$, the better The concentricity is preferably 65% or above, still preferably 70% or above.

$$e_c = \frac{e_{min}}{e_{max}} \times 100$$

$e_{min}$: minimum section thickness of coating
$e_{max}$: maximum section thickness of coating The unevenness in the coating thickness may be controlled by detecting the unevenness with a detector and adjusting, in the center of a die of a screw extruder, the clearance between the die and an electric wire manually or automatically or by controlling both the flow rate of a coating material and the temperature and pressure.

The application of a non-eccentric head is effective in reducing the unevenness in coating thickness.

If necessary, an electric wire which has been coated with the coating material of the present invention and shaped may be passed through a heating zone to thereby enhance the mechanical strengths of the coating. The temperature of the heating zone is lower than the melting point of the coating material and higher than the glass transition temperature thereof.

EFFECT OF THE INVENTION

The flame-retardant composition of the present invention is remarkably improved in lowering in the physical properties due to heat history as compared with the polyester coating material of the prior art and therefore has the following advantages:

(1) the coating material of the present invention exhibits high flame retardance and less lowering in the physical properties due to heat history, so that the material is favorably applied to an electric wire to be used in the neighborhood of a heat source, an engine of a transport or heat buildup part of an electric appliance, and (2) the coating material can be applied in a reduced thickness without damaging the mechanical and electrical characteristics and is excellent in flexing resistance, so that the use thereof brings about dramatic enhancement in utilization of a limited space. Particularly, the coating material is favorably applied to an electric wire to be used in a field characterized by limited spatial capacity and highly integrated information, for example, space rocket, airplane, transport (such as automobile), electric appliance, computer or information appliance.

The composition of the present invention has characteristics as described above, so that it can be favorably applied also to various appliances and parts other than those described above wherein the above characteristics are desired.

EXAMPLE

The present invention will now be described by referring to the following Examples, though it is not limited to thereto.

EXAMPLE 1

100 parts by weight of polybutylene terephthalate (PBT) (intrinsic viscosity: 0.95) was powder-mixed with 10 parts by weight of tetrabromoterephthalic acid (hereinafter abbreviated to "TBTA") and 6 parts by weight of 2,2'-m-phenylenebis(2-oxazoline) (hereinafter abbreviated to "PBO") and the obtained mixture was homogeneously kneaded and pelletized with an ordinary extruder.

The obtained pellet was molded into a test piece with an injection molding machine. This test piece was examined for physical properties.

The physical properties were each determined as follows:

The tensile strength and elongation (%) were determined according to ASTM D 638. The dielectric breakdown was determined according to the short-time method of ASTM D 149, while the dielectric constant was determined according to DISO with 1 kHz. The flame retardance was determined by the test method according to UL-94 V and the case wherein the fire went out within 30 seconds was evaluated as "O", while the case wherein it did not go out therewithin was evaluated as "X". The oxygen index was determined according to JIS K 7201. The appearance was determined by observing the surface of the test piece which had been stored at 120° C. for 72 hours and the case wherein an abnormal phenomenon such as bleed or blister was observed was evaluated as "X", while the case wherein no abnormal phenomenon was observed was evaluated as "O".

Further, the piece for tensile test was stored in a thermostatic chamber of 120° C. for 500 hours to determine the elongation and elongation retention in a similar manner to the one described above.

Furthermore, a round compression-stranded conductor made of copper and having an outer diameter of about 1.9 mm was coated with the above composition as to give a coating thickness of 0.3 mm. Thus, an electric wire was produced. This electric wire was stored in a thermostatic chamber of 120° C. for 500 hours and subjected to flexing of 90° ten times to observe the surface of the wire. Thus, the flexing resistance thereof was determined. The case wherein fracture or fine crack was observed was evaluated as "X", while the case wherein no abnormal phenomenon was observed was evalated as "O".

The results are shown in Table 1.

EXAMPLE 2

100 parts by weight of the same PBT as that used in Example 1 was powder-mixed with 10 parts by weight of tetrabromobisphenol A (hereinafter abbreviated to "TBBA") and 6 parts by weight of PBO and the obtained mixture was kneaded and pelletized with an ordinary extruder.

The resin composition thus prepared was examined for physical properties in a similar manner to that described in Example 1.

The results are shown in Table 1.

EXAMPLE 3

100 parts by weight of the same PBT as that used in Example 1 or 2 was powder-mixed with 10 parts by weight of TBTA and 8 parts by weight of diphenylmethane-bis-4,4'-N,N''-diethyleneurea (hereinafter abbreviated to "MDIA"). The obtained mixture was kneaded and pelletized with an ordinary extruder.

The obtained resin composition was evaluated in a similar manner to that described in Example 1 or 2.

The results are shown in Table 1.

Comparative Example 1

100 parts by weight of the same PBT as that used in Examples 1 to 3 was powder-mixed with 10 parts by weight of decabromodiphenyl ether (hereinafter abbreviated to "DBDPE"). The obtained mixture was kneaded and pelletized with an ordinary extruder.

The obtained resin composition was evaluated in a similar manner to that used in Examples 1 to 3.

The results are shown in Table 1.

EXAMPLE 4

100 parts by weight of polyethylene terephthalate (PET) (intrinsic viscosity : 1.10) was powder-mixed with 10 parts by weight of TBTA and 6 parts by weight of PBO. The obtained mixture was kneaded and pelletized with an ordinary extruder.

The obtained resin composition was evaluated in a similar manner to that used in Example 1.

The results are shown in Table 1.

Comparative Example 2

80 parts by weight of the same PET as that used in Example 4 was powder-mixed with 10 parts by weight of DBDPE and the obtained mixture was kneaded and pelletized with an ordinary extruder.

The obtained resin composition was evaluated in a similar manner to that described in Example 1.

The results are shown in Table 1.

TABLE 1

|  | Ex. 1 | Ex. 2 | Ex. 3 | Comp. Ex. 1 | Ex. 4 | Comp. Ex. 2 |
|---|---|---|---|---|---|---|
| Polyester resin (parts by weight) | PBT (100) | | | | PET (100) | |
| Additives | | | | | | |
| TBTA (parts by weight) | 10 | — | 10 | — | 10 | — |
| TBBA " | — | 10 | — | — | — | — |
| DBDPE " | — | — | — | 10 | — | 10 |
| PBO " | 6 | 6 | — | — | 6 | — |
| MDIA " | — | — | 8 | — | — | — |
| Tensile strength (kg/cm$^2$) | 579 | 574 | 565 | 554 | 730 | 620 |
| Tensile elongation (%) | 280 | 280 | 265 | 170 | 280 | 120 |
| Izod impact strength (kg · cm/cm) (notched) | 14 | 14 | 13 | 4.0 | 18 | 10 |
| Dielectric breakdown | 16 | 16 | 16 | 15 | 16 | 16 |
| Appearance | O | O | O | X | O | X |
| Oxygen index | 27 | 27 | 27 | 28 | 27 | 28 |
| After the thermal treatment for 500 hours | | | | | | |
| tensile strength (kg/cm$^2$) | 585 | 580 | 577 | 569 | 760 | 690 |
| elongation retention (%) | 83 | 81 | 77 | 34 | 59 | 21 |
| flexing resistance | O | O | O | X | O | X |

We claim:

1. A flame-retardant resin composition consisting of essentially of (A) an aromatic polyester prepared by condensation polymerization between (a) a component substantially comprising an aromatic dicarboxylic acid or an ester-forming derivative thereof and (b) a component substantially comprising an aliphatic glycol or an ester-forming derivative thereof, (B) 0.1 to 30% by weight based on the total amount of the composition of a halogenated containing compound represented by the general formula (1) or (2) and (C) 0.1 to 30% by weight based on the total amount of the composition of a compound represented by the general formula (3):

  (1)

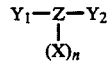  (2)

wherein X stands for a halogen atom; $Y_1$ and $Y_2$ are each a member selected from the group consisting of hydroxyl, carboxyl, glycidyl ester and glycidyl ether; Z is a monovalent or divalent organic group and n is an integer of 1 or more and $$L_1—M—L_2 \quad (3)$$

wherein $L_1$ and $L_2$ may be the same or different and are each a 3- to 8-membered cyclic reactive group selected from among those represented by the general formulae (5) and (6):

  (5)

  (6)

$R_2$ is a divalent organic group wherein a hydrogen atom directly bonded to the ring may be substituted with an alkyl and/or aryl group and M is a divalent organic group.

2. The flame-retardant resin composition according to claim 1, wherein said compound (B) represented by the general formula (1) or (2) has a molecular weight of 500 to 5,000.

3. The flame-retardant resin composition according to claim 1 or 2, wherein said compound (B) represented by the general formula (2) is a halogenated diol and/or a halogenated dicarboxylic acid.

4. The flame-retardant resin composition according to any one of claims 1 and 2, wherein the halogen atom (X) in the compound (B) represented by the general formula (1) or (2) is bromine.

5. The flame-retardant resin composition according to any one of claims 1 and 2 which further contains a stabilizer in an amount of 0.1 to 3% by weight based on the total amount of the composition, wherein said stabilizer is an antioxidant, an ultraviolet absorber or an antistatic agent.

6. An electric wire coated with a coating material comprising a flame-retardant resin composition as defined in claim 1.

7. The electric wire according to claim 6, wherein said wire is a low-voltage wire.

8. The flame-retardant resin composition according to claim 4, which further contains a stabilizer in an amount of 0.1 to 3% by weight based on the total amount of the composition, wherein said stabilizer is an antioxidant, an ultraviolet absorber or an antistatic agent.

9. The flame-retardant resin composition according to claim 1, wherein X of general formula (1) or (2) is Br.

10. The flame-retardant resin composition according to claim 1, wherein the monovalent or divalent organic group of Z of general formula (1) or (2) is

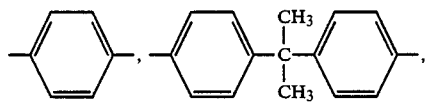,

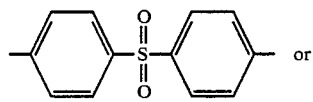

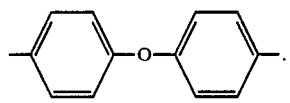 or

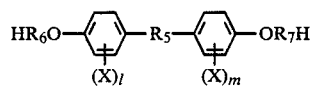.

11. The flame-retardant resin composition according to claim 1, wherein the compound (B) is represented by general formulae (8) to (15):

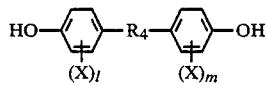 (8)

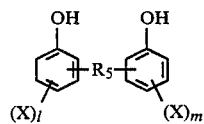 (9)

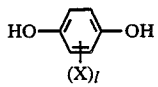 (10)

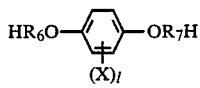 (11)

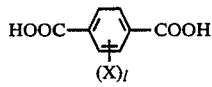 (12)

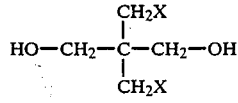 (13)

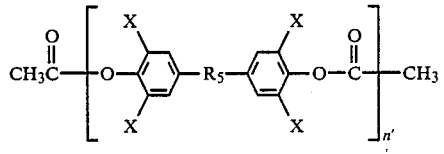 (14)

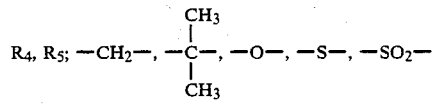 (15)

wherein
$R_4$, $R_5$; is a divalent group selected from the among $R_4$, $R_5$; $-CH_2-$, $-\underset{\underset{CH_3}{|}}{\overset{\overset{CH_3}{|}}{C}}-$, $-O-$, $-S-$, $-SO_2-$ $R_6$, $R_7$; a divalent group selected from among
$R_6$, $R_7$; $-C_2H_4-$, $-C_3H_6-$, $-(C_2H_4O)_n-$, $-(C_3H_6O)_n-$
X; a halogen atom
l, m; 1 to 4
n'; an integer of 1 or higher.

12. The flame-retardant resin composition according to claim 1, wherein $R_2$ of general formula (5) of compound (C) is a straight alkylene having 1 to 6 carbon atoms or said straight alkylene having substituents of $C_1$ to $C_6$ alkyl or phenyl.

13. The flame-retardant resin composition according to claim 1, wherein the divalent organic group of M of compound (C) is a $C_1$ to $C_{10}$ alkylene or an organic group having at least one aromatic ring or alicyclic ring.

* * * * *